United States Patent [19]
Gifford

[11] Patent Number: 5,464,069
[45] Date of Patent: Nov. 7, 1995

[54] GROUND EFFECT VEHICLE

[76] Inventor: William J. Gifford, 335 W. Moss Mill Rd., Fog Harbor, N.J. 08215

[21] Appl. No.: 285,826

[22] Filed: Aug. 4, 1994

[51] Int. Cl.$^6$ .................................................... B60V 1/11
[52] U.S. Cl. ....................... 180/116; 114/67 A; 180/117; 440/37
[58] Field of Search .............................. 180/116, 117, 180/120, 124, 126, 127; 114/67 A, 289, 290; 440/37

[56] References Cited

U.S. PATENT DOCUMENTS

| | | | |
|---|---|---|---|
| 3,106,260 | 10/1963 | Bollum, Sr. | 180/116 |
| 3,153,461 | 10/1964 | Bollum, Jr. | 114/67 A |
| 3,185,240 | 5/1965 | Eggington et al. | 180/121 |
| 3,330,240 | 7/1967 | Hardy et al. | 114/67 A |
| 3,589,058 | 6/1971 | Labat | 446/179 |
| 3,687,217 | 8/1972 | Mueller | 180/120 |
| 3,709,318 | 1/1973 | Ferguson | 180/116 |
| 3,765,357 | 10/1973 | Peri | 114/67 A |
| 3,931,864 | 1/1976 | Desbarats | 180/116 |
| 5,000,107 | 3/1991 | Burg | 114/67 A |
| 5,176,095 | 1/1993 | Burg | 114/67 A |
| 5,203,274 | 4/1993 | Hart et al. | 114/270 |

FOREIGN PATENT DOCUMENTS

| | | | |
|---|---|---|---|
| 8700492 | 1/1987 | WIPO | 180/117 |

*Primary Examiner*—Mitchell J. Hill
*Attorney, Agent, or Firm*—Jacobson, Price, Holman & Stern

[57] ABSTRACT

A delta wing form body is provided having a central forward apex as well as rear opposite side apices. Each apex includes a vertical powered fan duct assembly extending therethrough and the rear of the wing form body includes forward thrust developing horizontal fan duct assemblies while the center of the body includes laterally and longitudinally shiftable weight structure for omnidirectional shifting of the center of gravity of the wing form body. The center and opposite side fan duct assemblies open downwardly into central and opposite side downwardly opening longitudinal tunnels, respectively, each including retractable and extendable front and rear flap assemblies. The wing form body also includes rear forward thrust developing propulsion fan duct assemblies and all of the fan duct assemblies are variably speed driven from a single power source.

21 Claims, 3 Drawing Sheets

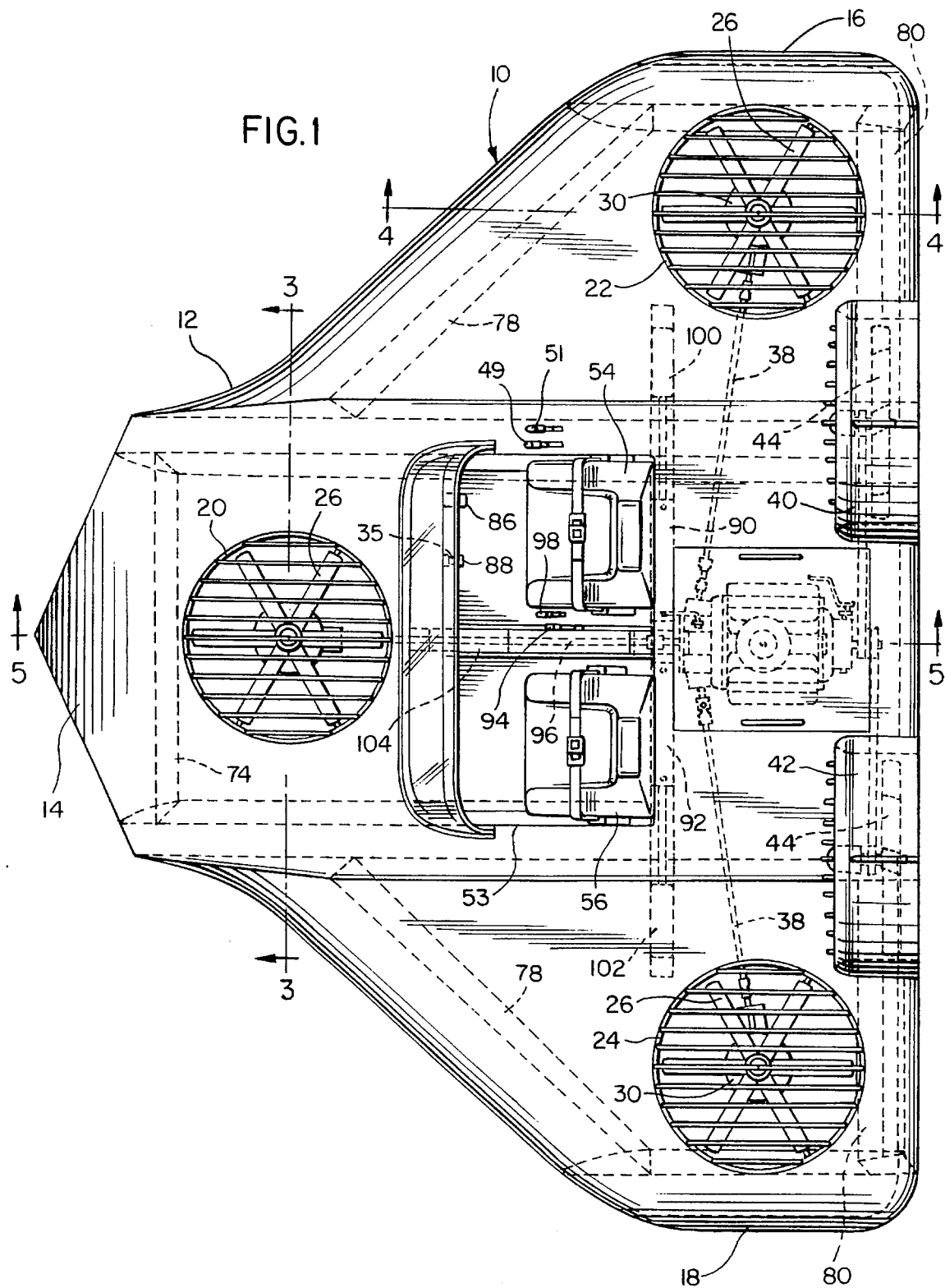

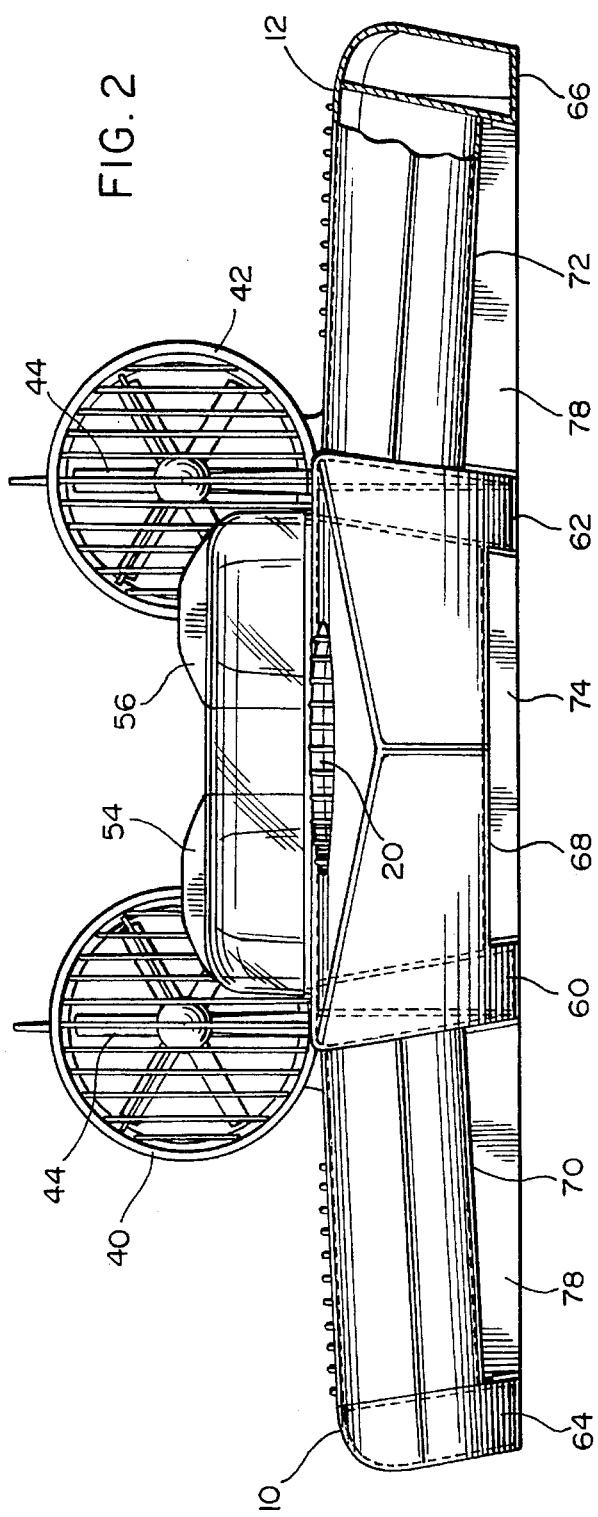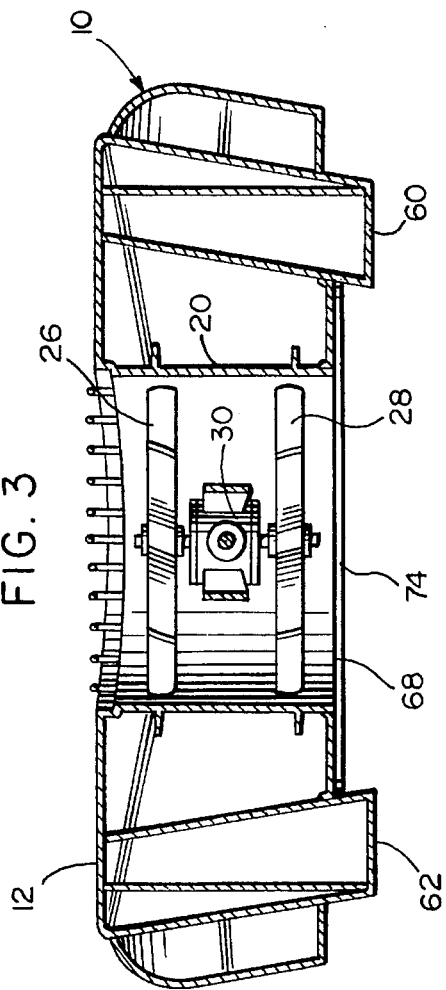

GROUND EFFECT VEHICLE

BACKGROUND OF THE INVENTION

1. Field of the Invention

This invention relates to a delta wing form body for a ground effect vehicle which has a center forward apex as well as opposite side apices, each apex including a vertical powered fan duct assembly extending therethrough. The rear of the wing form body includes forward thrust developing horizontal fan duct assemblies while the center of the body includes laterally and longitudinally shiftable weight structure for omnidirectional shifting of the center of gravity of the wing form body.

2. Description of Related Art

Various different forms of ground effect and air cushion vehicles heretofore have been provided and most of these vehicles are amphibious in nature.

A distinction is herein made between air cushion vehicles and ground effect vehicles in that air cushion vehicles, generally, do not employ any airfoil surfaces to augment lift during rapid forward movement, whereas ground effect vehicles, while not capable of sustained flight at high elevations, employ airfoil surfaces effective to provide minimum lift during forward movement to augment the air cushion effect of the vehicle and allow horizontal flight at elevations under ten feet and brief climbs above ten feet to perhaps as much as thirty feet as a result of forward momentum.

Examples of various different forms of air cushion and ground effect vehicles including some of the general structural and operational features of the instant invention are disclosed in U.S. Pat. Nos. 3,106,260, 3,185,240, 3,589,058, 3,687,217, 3,709,318, 3,765,357, 3,931,864, 5,000,107, 5,203,274 and 5,176,095. However, these previously known devices do not include the overall combination of structural and operational features presented by the instant invention.

SUMMARY OF THE INVENTION

The ground effect vehicle of the instant invention has been specifically designed to provide a recreational, rescue and/or light transport vehicle which will be capable of amphibious operation over land and water and which will have the capacity to briefly climb over obstacles of thirty feet or more in height. On the other hand, the vehicle of the present invention has a reduced weight carrying capacity as compared to the weight carrying capacity of a pure air cushion vehicle as a tradeoff for the brief thirty foot obstacle clearance ability of the vehicle.

A delta-shaped wing form body having a center forward apex as well as rear opposite side apices is provided and each apex includes a vertical powered fan duct assembly extending therethrough. The rear of the wing form body includes forward thrust developing horizontal fan duct assemblies while the center of the body includes laterally and longitudinally shiftable weight structure for omnidirectional shifting of the center of gravity of the wing form body. The body includes a central station for an operator (and at least one passenger) from which the weight structure may be controllably shifted. The center and opposite side fan duct assemblies open downwardly into central and opposite side downwardly opening tunnels, respectively, each tunnel preferably including retractable and extendable front and rear flap assemblies to provide air cushion operation if desired. In addition, the central and opposite side downwardly opening tunnels are preferably separated by inner opposite side downwardly projecting and longitudinally extending buoyant pontoon portions while the outer sides of the opposite side tunnels are also preferably defined by downwardly projecting and longitudinally extending outer pontoon structures.

By providing a ground effect vehicle of any plan shape and including a central forward vertical fan duct assembly as well as opposite side rear fan duct assemblies and wherein the amount of lift air generated by the forward fan duct assembly may be varied independently of the amount of lift air generated by the rear duct assemblies, a very stable air cushion platform is provided due to the "three point suspension" of the ground effect vehicle when operating in the air cushion mode. Further, the inclusion of manually operable front and rear flap assemblies controlling the discharge of air forwardly and rearwardly from each of the central and opposite side downwardly opening tunnels provides even further control of stability of the vehicle when operating in the air cushion mode.

Also, by providing a ground effect vehicle including opposite side depending longitudinal pontoon structures as well as a pair of laterally spaced depending and longitudinal central pontoon structures, the desired central and opposite side longitudinally extending tunnels are defined into which the forward and rear fan duct assemblies may discharge their air cushion lift air. The inclusion of the underside tunnels increases the ground effect mode of operation of the vehicle and the addition of either manually operated or automatic front and rear flaps for each of the tunnels increases the efficiency of the air cushion mode of operation of the vehicle.

Still further, by providing a wing form body of delta plan shape including at least one vertical fan duct assembly opening downwardly through each apex of the delta shaped body, a considerably more stable delta shaped wing form body is provided, independent of the inclusion of center and opposite side tunnels including front and rear flaps.

The main object of this invention is to provide a ground effect vehicle of the amphibious type which will be capable of sustained flight at approximately five-to-ten foot elevation (depending upon loading) and which also will be capable of brief increases in elevation to approximately thirty feet or more in order to clear objects of nearly that height.

Another object of this invention is to provide a ground effect vehicle including both longitudinally and laterally shiftable weight structure under the control of the operator of the vehicle whereby the center of gravity of the vehicle may be omnidirectionally shifted in the medial plane of the delta-shaped wing form body of the vehicle.

Another important object of this invention is to provide a ground effect vehicle capable of air cushion operation in that it includes depending peripheral boundary structure for containing an air cushion and yet with the transverse forward and rearward boundary structure being in the form of upwardly retractable flaps for conversion to airfoil operation for augmenting the ground effect operation principle thereof.

Still another object of this invention is to provide a ground effect vehicle in accordance with the preceding object and wherein the front and rear boundary structure defining retractable flaps may be either positively operated by the operator of the vehicle or automatically retracted responsive to rapid forward movement of the vehicle.

A further object of this invention is to provide a ground effect vehicle including multiple lift and propulsion fans driven by a single power source.

Yet a further object of this invention to be specifically enumerated herein is to provide a ground effect vehicle in accordance with the preceding objects and which will conform to conventional forms of manufacture, be of simple construction and easy to pilot so as to provide a device that will be economically feasible, long lasting and relatively trouble free in operation.

These together with other objects and advantages which will become subsequentially apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of the preferred embodiment of the ground effect vehicle of the present invention;

FIG. 2 is a front elevational view of the preferred ground effect vehicle with the tunnel flaps illustrated in the deployed positions;

FIG. 3 is an enlarged transverse vertical sectional view taken substantially upon the plane indicated by the section line 3—3 of FIG. 1 and illustrating the forward central tunnel flap in a retracted position;

DETAILED DESCRIPTION OF THE PREFERRED EMBODIMENTS OF THE INVENTION

Figure 4:
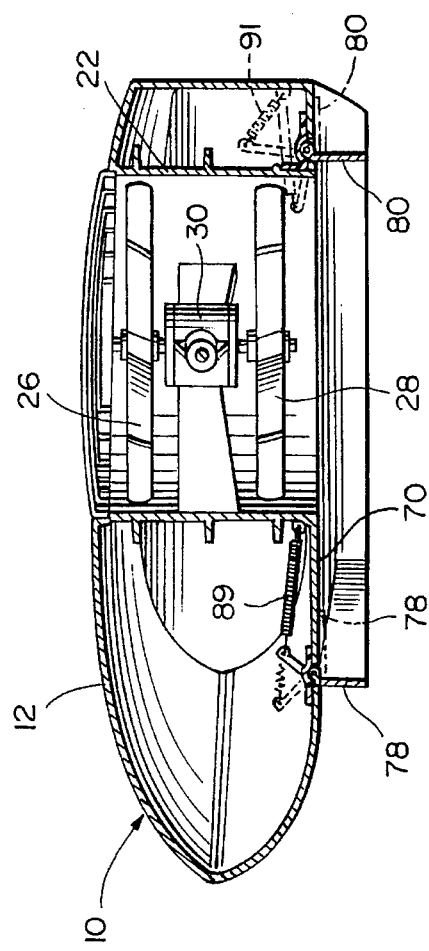
FIG. 4 is an enlarged longitudinal vertical sectional view taken substantially upon the plane indicated by the section line 4—4 of FIG. 1 and illustrating an automatically actuated form of flaps in the deployed positions.

Referring now more specifically to the drawings the numeral 10 generally designates the preferred ground effect vehicle of the instant invention which includes a generally delta-shaped wing form body 12 having a central, forward apex portion 14 at the forward end portion of a central longitudinal zone of the body and a pair of lateral opposite side rear apex portions 16 and 18 at the rear end portions of a pair of opposite side body zones between which the central body zone is disposed. The body 12 also defines a longitudinal centerline disposed generally along the section line 5—5 of FIG. 1.

The forward apex portion 14 includes a vertical air duct 20 extending therethrough and the apex portions 16 and 18 include similar vertical air ducts 22 and 24 extending vertically therethrough. Each vertical air duct 20, 22 and 24 includes upper and lower counter-rotating axial flow fans 26 and 28 disposed therein driven through a gear box 30 and the gear boxes 30 are driven from a variable speed hydrostatic transmission 32 receiving rotary torque from an engine 34. The transmission 32 is controlled by a speed control rod 34 and the transmission 32 drives the forward center gear box 30 through a drive shaft 36 while corresponding rear, lateral opposite side gear boxes 30 are driven from the transmission through drive shafts 38. It is to be noted that the speed of operation of the engine 34 preferably will be under the control of a throttle control 35, see FIGS. 1 and 5.

Figure 5:
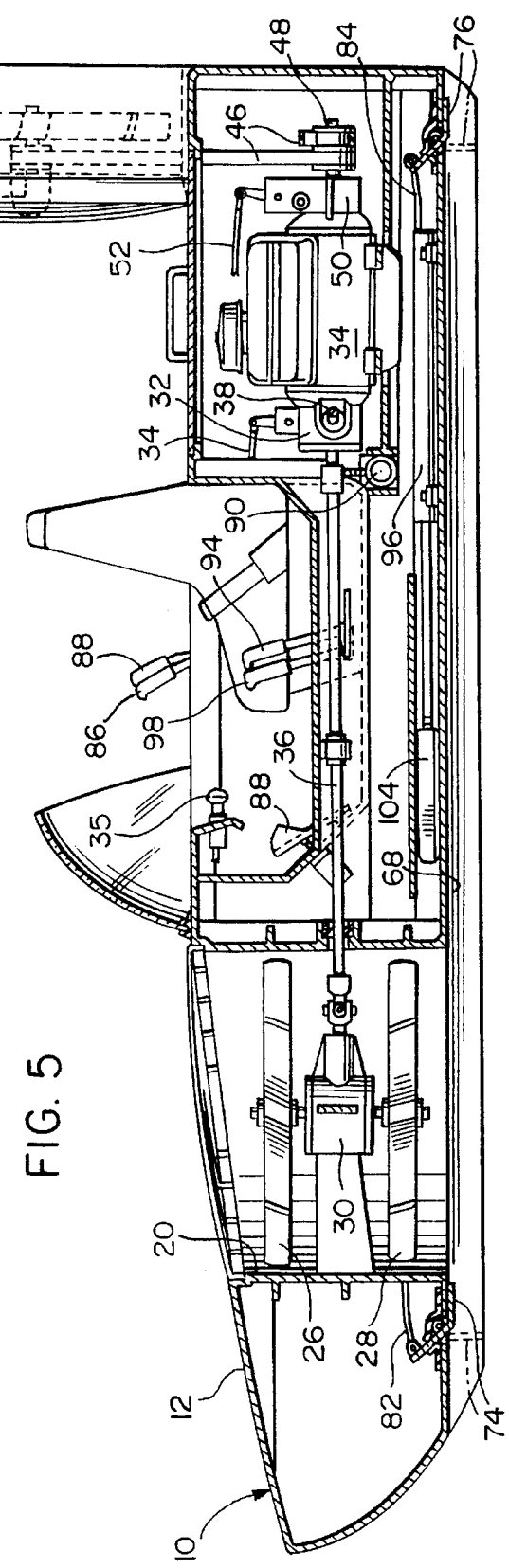
FIG. 5 is an enlarged longitudinal vertical sectional view taken substantially upon the plane indicated by the section line 5—5 of FIG. 1 and illustrating the front and rear flaps of the central tunnel being of a manual control actuated type and illustrated in the retracted positions.

Mounted to the rear and inboard of the opposite side rear ducts 22 and 24 are a pair of vertical fan ducts 40 and 42 each having at least one axial flow fan 44 journaled therein and driven by belts 46 driven from a rear power output shaft 48 of the engine 34 driven through a second variable speed hydrostatic transmission 50 under the control of a speed control rod 52, the rods 34 and 52 being actuated by levers 49 and 51 (see FIGS. 1 and 5).

If it is desired, each of the air ducts 40 and 42 can include counter-rotating fans such as the fans 26 and 28 and be driven by a similar drive shaft and gear box arrangement from the transmission 50. However, if only single fans are used in the fan ducts 40 and 42, they will be opposite rotating fans.

Immediately rearward of the air duct 20 is a central operator's station 53 including preferably operator and passenger seats 54 and 56 and the engine 34 is disposed rearward of the station 53. This places the concentration of weight of the vehicle 10 generally along a plane passing through the axes of rotation of the fans 26 and 28 disposed in the air ducts 22 and 24.

It will be noted from FIG. 4 that the longitudinal vertical sectional cross section or shape of the opposite side portions of the body 12 is in the form of an airfoil whereby at least the opposite side portions of the body 12 are operational to generate lift forces as the body 12 moves forwardly through a body of air.

The underside of the body 12 includes a pair of inner, depending and longitudinal buoyant pontoons or pontoon portions 60 and 62 and a second pair of outer, longitudinally extending buoyant and depending pontoons or pontoon portions 64 and 66. A central downwardly opening tunnel 68 is defined between the pontoon portions 60 and 62 and opposite side longitudinal side tunnels 70 and 72 are defined between the pontoons 60 and 64 and the pontoons 62 and 66. The tunnels 68, 70 and 72 open downwardly and are open at their front and rear ends, but the front and rear ends of the center tunnel 68 are removably closable by pivotally mounted front and rear flaps 74 and 76 while the opposite side tunnels 70 and 72 are closable at their front and rear ends by pivotally mounted front and rear flaps 78 and 80.

As illustrated in FIG. 5, flaps 74 and 76 are under the control of control rods 82 and 84, respectively, and the control rods 82 and 84 are under the control of pivoted foot pedals 86 and 88. In the event the flaps 78 and 80 also are to be manually controlled, the pairs of flaps 78 and 80 also will be under the control of the pedals 86 and 88. However, if desired, all of the flaps 74, 76 and 78, 80 may be of the automatic type such as the flaps 78 and 80 illustrated in FIG. 4 and normally biased to a depending, deployed position by attendant expansion springs 89 and 91 and swingable to retracted positions by ram air against the front sides thereof. Alternately, the front and rear flaps 78 and 80 for the tunnels 70 and 72 may be of the automatic type illustrated in FIG. 4 and only the center flaps 74 and 76 may be under the control of the pedals 86 an 88. Still further, if it is desired, the center flaps 74 and 76 may be of the automatic type illustrated in FIG. 4 and the flaps 78 and 80 illustrated in FIG. 4 may be under the control of the pedals 86 and 88.

With attention now invited more specifically to FIGS. 1 and 2, there may be seen a pair of transverse double acting fluid cylinders 90 and 92 under the control an operating lever 94 and a hydraulic cylinder 96 under the control of an operating lever 98. The cylinders 90 and 92 are operative to laterally extend and retract, inversely, guidingly supported weight members 100 and 102 and the cylinder 96 is operative to shift a third guidingly supported weight member 104 along a front to rear extending path relative to the body 12. In this manner, the center of gravity of the vehicle 10, as loaded, may be omnidirectionally shifted in a horizontal plane, as desired, to change the attitude of the body 12 as it is moving through the air or hovering in a stationary manner. Further, each of the ducts 40 and 42 may have an adjustable rudder (not shown) operatively associated therewith, although if the flaps 78 and 80 are manually controllable, adjustable rudders may not be necessary.

In operation, the engine 34 is started and the hydrostatic transmission 32 is actuated to drive the fans 26 and 28 in all three ducts 20, 22 and 24. At this time, the flaps 74, 76 and 78, 80 are deployed and as the engine speed and fan speed increase an air cushion will be formed in the tunnels 68, 70 and 72 to elevate the vehicle 10 relative to a horizontal surface upon which it is disposed. As the vehicle 10 lifts from the horizontal surface, the weights 100, 102 and 104 are shifted such that the center of gravity of the gross weight of the vehicle 10 is centered along the longitudinal center line of the vehicle 10. Then, the transmission 50 may be actuated to cause rotation of the fans 44 and the vehicle will proceed forwardly riding on an air cushion contained by the flaps 74, 76, 78 and 80.

As the speed of forward movement of the vehicle increases to the point wherein the airfoil shape of the body 12 becomes effective, the vehicle 10 is placed in a slightly nose up attitude such that the wing form body 12 will render a ground effect as well as an airfoil lift to increase the elevation of the vehicle 10 well above the horizontal surface over which it is moving. As the forward speed of the vehicle still further increases, forward momentum will increase, and although the vehicle 10 is incapable of sustained flight at elevations of thirty feet, the appreciable increase in forward momentum of the vehicle 10 will allow the same to briefly assume a further nose-up attitude and climb to an elevation of at least thirty feet before leveling off and gliding back down to ground effect altitude. Of course, as the speed of the vehicle 12 initially increases to the lower limit of ground effect speed, the flaps 74, 76, 78 and 80, if spring biased, automatically retract to improve the lift characteristics of the body 12. If, on the other hand, the flaps are to be only manually operated, they are manually retracted as ground effect speed is approached.

The foregoing description of the preferred embodiments is considered as illustrative only of the principles of the invention. Further, since numerous modifications and changes readily will occur to those skilled in the art, it is not desired to limit the invention to the exact construction and operation shown and described. Accordingly, all suitable modifications and equivalents may be resorted to, falling within the scope of the invention.

What is claimed as new is as follows:

1. A ground effect vehicle including a generally delta wing form body defining a central, forward apex portion and a pair of opposite lateral side rear apex portions, said forward and rear apex portions defining forward and rear, respectively, generally vertical air ducts therethrough each having lift air flow thrust developing means operatively associated therewith for generating variable velocity air flow downwardly therethrough, and propulsion air flow thrust developing means carried by said body for effecting a forward thrust to said body.

2. The vehicle of claim 1 wherein said body includes an underside defining a central open ended and downwardly opening longitudinal tunnel and opposite side open ended and downwardly open longitudinal tunnels on opposite sides of said central tunnel, said forward and rear air ducts opening downwardly into said central and opposite side tunnels, respectively.

3. The vehicle of claim 2 including downwardly deployable and upwardly retractable flaps carried by said body at the front and rear end portions of each of said tunnels and operative to effectively close the front and rear portions thereof.

4. The vehicle of claim 3 including control means operative to selectively deploy and retract at least said flaps at the forward and rear end portions of said opposite side tunnels.

5. The vehicle of claim 4 wherein said flaps at the front and rear ends of said central tunnel are yieldingly downwardly biased and are upwardly retractable by air flow rearward through said central tunnel above a predetermined velocity.

6. The vehicle of claim 2 wherein the lateral extremities of said tunnels are defined by elongated pontoon portions of said body depending downwardly therefrom between said central and opposite side tunnels and along the remote sides of said opposite side tunnels.

7. The vehicle of claim 1 wherein said vehicle includes a central operator's station closely rearward of said forward vertical air duct and rotary torque generating means closely rearward of said station drivingly connected to said lift air flow thrust developing means and said propulsion air flow thrust developing means.

8. The vehicle of claim 1 wherein each of said lift air flow thrust developing means includes a pair of counter-rotating vertically spaced axial flow fans.

9. A ground effect vehicle including a body defining a central, forward vertical air duct and rear, opposite side vertical air ducts therethrough, each air duct having lift air flow thrust developing means operatively associated therewith for generating variable velocity air flow downwardly therethrough, laterally and longitudinally shiftable weight means shiftably supported from said body for adjustment both laterally and longitudinally of said body, and a central operator's station associated with said body and including control means for adjustably shifting said weight means both laterally and longitudinally of said body.

10. The vehicle of claim 9 wherein each of said lift air flow thrust developing means includes a pair of counter-rotating vertically spaced axial flow fans.

11. The vehicle of claim 9 wherein said body includes an undersurface defining central and opposite side open ended and downwardly opening longitudinal central tunnels downwardly into which said forward and rear air ducts, respectively, open and propulsion air flow thrust developing means carried by said body for effecting a forward thrust on said body.

12. The vehicle of claim 11 including downwardly deployable and upwardly retractable flaps carried by said body at the opposite ends of each of said tunnels and operative to effectively close the corresponding ends thereof.

13. The vehicle of claim 12 including control means operative to selectively deploy and retract at least said flaps at said corresponding ends of said opposite side tunnels.

14. The vehicle of claim 13 wherein said flaps at said corresponding ends of said central tunnel are yieldingly biased toward the deployed positions thereof and are retractable by the presence of rearward air flow thereon above a predetermined velocity.

15. The vehicle of claim 14 including elongated pontoon portions of said body depending downwardly therefrom between said opposite side and central tunnels and along the remote sides of said opposite side tunnels.

16. A ground effect vehicle including a body defining an underside and a longitudinal centerline, said underside defining a plurality of laterally spaced, downwardly opening and open ended longitudinal tunnels, lift air flow thrust developing means carried by said body operative to downwardly discharge variable velocity lift air into each of said tunnels, and propulsion air flow thrust developing means carried by said body operative to effect a forward thrust to said body.

17. The ground effect vehicle of claim 16 wherein said tunnels include a central longitudinal tunnel and a pair of lateral opposite side longitudinal tunnels.

18. The ground effect vehicle of claim 17 wherein said body is delta wing-shaped in plan including a forward apex and rear opposite side apices, said lift air flow developing means including a central, forward air duct extending vertically through said forward apex, opposite side rear air ducts extending vertically through said rear apices and driven axial flow fans journaled in each of said air ducts.

19. The ground effect vehicle of claim 18 wherein said tunnels are defined between a pair of depending lateral opposite side longitudinal pontoons projecting downwardly from said opposite side apices and at least one central longitudinal pontoon projecting downwardly from said body.

20. The ground effect vehicle of claim 18 wherein said tunnels are defined between a pair of depending lateral opposite side longitudinal pontoons projecting downwardly from said opposite side apices and a second pair of laterally spaced pontoons projecting downwardly from said body inwardly of said opposite side longitudinal pontoons.

21. A ground effect vehicle including a body delta wing-shaped in plan and defining a longitudinal centerline and a central forward apex as well as a pair of rear opposite side apices, said body further defining a longitudinal central body zone defining said forward apex and a pair of lateral opposite side body zones defining said rear apices, at least one of said body zones including lift air flow thrust developing means operative to downwardly discharge variable velocity lift air therefrom, at least said lateral opposite side body zones including an air foil shape in longitudinal vertical section, and propulsion air flow thrust developing means carried by said body operative to effect a forward thrust to said body.

* * * * *

UNITED STATES PATENT AND TRADEMARK OFFICE
CERTIFICATE OF CORRECTION

PATENT NO. : 5,464,069
DATED : November 7, 1995
INVENTOR(S) : William J. GIFFORD It is certified that error appears in the above-indentified patent and that said Letters Patent is hereby corrected as shown below:

On title page, item [76],
  delete "Fog Harbor" and insert --Egg Harbor--.

Signed and Sealed this

Twenty-first Day of May, 1996

Attest:

BRUCE LEHMAN

*Attesting Officer*    *Commissioner of Patents and Trademarks*